United States Patent
Roll et al.

(10) Patent No.: US 8,527,663 B2
(45) Date of Patent: *Sep. 3, 2013

(54) METHODS AND APPARATUS FOR PERFORMING NON-INTRUSIVE NETWORK LAYER PERFORMANCE MEASUREMENT IN COMMUNICATION NETWORKS

(75) Inventors: Jonathan Roll, Austin, TX (US); Barbara Smith, San Antonio, TX (US); Joel Freeman, Spring Branch, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 572 days.

This patent is subject to a terminal disclaimer.

(21) Appl. No.: 11/962,420

(22) Filed: Dec. 21, 2007

(65) Prior Publication Data

US 2009/0164625 A1    Jun. 25, 2009

(51) Int. Cl.
     *G06F 15/16*      (2006.01)

(52) U.S. Cl.
     USPC ............................................................ 709/250

(58) Field of Classification Search
     USPC ............................................................ 709/250
     See application file for complete search history.

(56) References Cited

U.S. PATENT DOCUMENTS

| | | | | |
|---|---|---|---|---|
| 4,925,311 | A * | 5/1990 | Neches et al. | ............... 718/100 |
| 6,169,742 | B1 | 1/2001 | Chow et al. | |
| 6,397,539 | B1 | 6/2002 | Kimura | |
| 6,405,103 | B1 * | 6/2002 | Ryan et al. | ............... 700/275 |
| 6,408,335 | B1 | 6/2002 | Schwaller et al. | |
| 6,418,324 | B1 * | 7/2002 | Doviak et al. | ............ 455/426.1 |
| 6,427,173 | B1 | 7/2002 | Boucher et al. | |
| 6,434,620 | B1 | 8/2002 | Boucher et al. | |
| 6,470,013 | B1 | 10/2002 | Barach et al. | |
| 6,687,758 | B2 | 2/2004 | Craft et al. | |
| 6,711,137 | B1 | 3/2004 | Klassen et al. | |
| 6,718,379 | B1 | 4/2004 | Krishna et al. | |
| 6,751,665 | B2 | 6/2004 | Philbrick et al. | |
| 6,775,273 | B1 | 8/2004 | Kung et al. | |

(Continued)

FOREIGN PATENT DOCUMENTS

EP      0910194 A2 *    4/1999

OTHER PUBLICATIONS

United States Patent and Trademark Office, Final Office Action issued in connection with U.S. Appl. No. 11/962,425 mailed Jun. 25, 2010 (45 pages).

(Continued)

*Primary Examiner* — Hieu Hoang
(74) *Attorney, Agent, or Firm* — Hanley, Flight & Zimmerman, LLC

(57) ABSTRACT

Methods and apparatus for performing non-intrusive network layer performance measurement in communication networks are disclosed. An example method to measure network layer performance between existing network nodes disclosed herein comprises coupling a first intelligent network interface (INI) to an available access port of a first existing network node providing access to a network, wherein the first INI obtains power and input information only from the access port after being coupled thereto, and exchanging test messages between the first INI and a second INI coupled to a second existing network node during normal operation of the first and second existing network nodes to measure network layer performance, wherein the test messages originate in the first INI and are routed through the first and second existing network nodes using a first network layer address associated with the first INI and a second network layer address associated with the second INI.

25 Claims, 11 Drawing Sheets

(56) References Cited

U.S. PATENT DOCUMENTS

| | | |
|---|---|---|
| 6,928,478 B1 | 8/2005 | Gangadharan |
| 6,965,941 B2 | 11/2005 | Boucher et al. |
| 6,996,132 B1 | 2/2006 | Tolety |
| 7,058,059 B1 | 6/2006 | Henry et al. |
| 7,076,568 B2 | 7/2006 | Philbrick et al. |
| 7,089,326 B2 | 8/2006 | Boucher et al. |
| 7,124,205 B2 | 10/2006 | Craft et al. |
| 7,162,510 B2 | 1/2007 | Jammes |
| 7,167,926 B1 | 1/2007 | Boucher et al. |
| 7,197,047 B2 | 3/2007 | Latif et al. |
| 7,206,970 B1* | 4/2007 | Lauterbach et al. ............ 714/36 |
| 7,216,226 B2* | 5/2007 | Ndiaye ......................... 713/155 |
| 7,222,190 B2 | 5/2007 | Klinker et al. |
| 7,225,244 B2 | 5/2007 | Reynolds et al. |
| 7,245,927 B2 | 7/2007 | Hansen |
| 8,040,819 B2* | 10/2011 | Harrington et al. ........... 370/254 |
| 8,250,357 B2* | 8/2012 | Sun et al. ...................... 713/153 |
| 2003/0009696 A1* | 1/2003 | Bunker et al. ................ 713/201 |
| 2003/0033406 A1* | 2/2003 | John et al. .................... 709/224 |
| 2003/0177245 A1 | 9/2003 | Hansen |
| 2003/0189930 A1* | 10/2003 | Terrell et al. ................. 370/389 |
| 2004/0062246 A1 | 4/2004 | Boucher et al. |
| 2004/0179546 A1 | 9/2004 | McDaniel et al. |
| 2004/0249975 A1 | 12/2004 | Tuck et al. |
| 2004/0252646 A1* | 12/2004 | Adhikari et al. .............. 370/252 |
| 2005/0050190 A1* | 3/2005 | Dube ............................ 709/223 |
| 2005/0195813 A1 | 9/2005 | Ambe et al. |
| 2006/0098670 A1* | 5/2006 | Voit et al. ...................... 370/401 |
| 2006/0153070 A1* | 7/2006 | DelRegno et al. ............. 370/229 |
| 2007/0115962 A1* | 5/2007 | Mammoliti et al. .......... 370/389 |
| 2007/0173222 A1 | 7/2007 | Hansen |
| 2008/0005602 A1* | 1/2008 | Diab et al. .................... 713/300 |
| 2008/0008202 A1* | 1/2008 | Terrell et al. .................. 370/401 |
| 2008/0040632 A1* | 2/2008 | Chen et al. ...................... 714/28 |
| 2008/0181100 A1* | 7/2008 | Yang et al. .................... 370/216 |
| 2009/0164626 A1 | 6/2009 | Roll et al. |

OTHER PUBLICATIONS

United States Patent and Trademark Office, Non-Final Office Action issued in connection with U.S. Appl. No. 11/962,425 mailed Dec. 23, 2009 (52 pages).

United States Patent and Trademark Office, "Office Action," issued in connection with U.S. Appl. No. 11/962,425 on Oct. 5, 2011 (61 pages).

USPTO, "Final Office Action," issued in connection with U.S. Appl. No. 11/962,425, on Aug. 23, 2012 (32 pages).

* cited by examiner

METHODS AND APPARATUS FOR PERFORMING NON-INTRUSIVE NETWORK LAYER PERFORMANCE MEASUREMENT IN COMMUNICATION NETWORKS

FIELD OF THE DISCLOSURE

This disclosure relates generally to communication networks and, more particularly, to methods and apparatus for performing non-intrusive network layer performance measurement in communication networks.

BACKGROUND

Today's network operators and service providers offer a variety of private network solutions to their customers. Such private networks include, for example, virtual local area networks (VLANs), virtual private networks (VPNs), virtual private LAN service (VPLS) networks, etc. The performance of a particular customer's private network may need to be measured to ensure the customer obtains a certain level of service guaranteed by, for example, a service level agreement (SLA). Thus, determining accurate network performance measurements is an aspect of providing competitive private network solutions.

In conventional private networks, as well as public networks, network performance is typically measured by a standalone testing node or an existing node that is configured to operate in a resident test mode. For example, a separate computer or testing device may be coupled to the network and configured to generate traffic and monitor the resulting network performance. However, such standalone testing nodes can be costly and require separate power sources. In another example, a network node, such as, for example, a router, may be configured to operate in a resident test mode to exchange data with other similarly configured network nodes. However, the resident test modes for network nodes (e.g., such as routers) from different manufacturers may be incompatible. Furthermore, operation in the resident test mode typically requires normal network traffic to be suspended.

DETAILED DESCRIPTION

Figure 1:
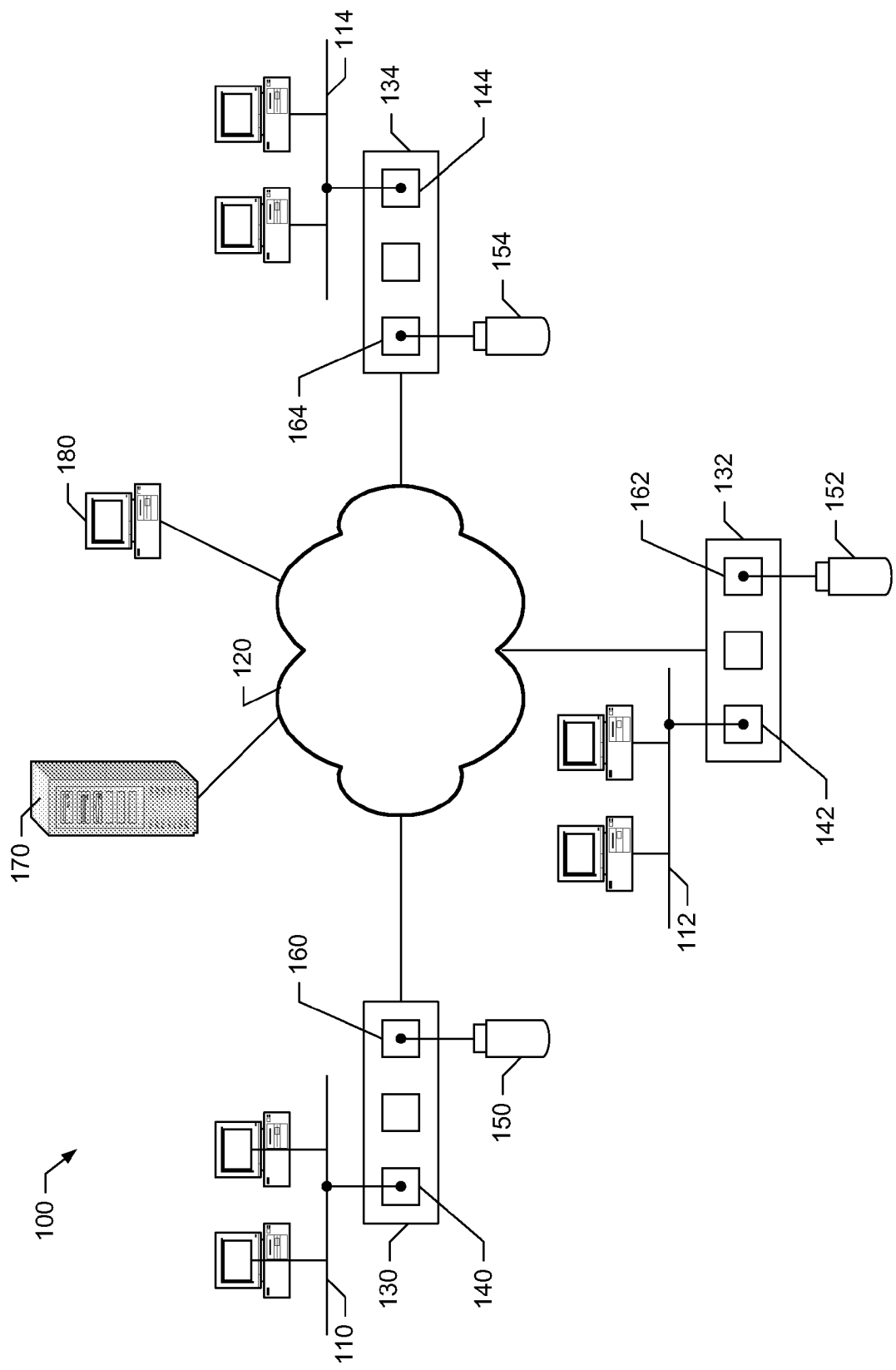
FIG. 1 is a block diagram of an example communication network including intelligent network interfaces (INIs) and an example data collection facility for performing non-intrusive performance measurements according to the methods and apparatus described herein.

A block diagram of an example communication network 100 capable of performing non-intrusive performance measurements according to the methods and apparatus described herein is illustrated in FIG. 1. The example communication network 100 implements a private network, such as, for example, a virtual local area network (VLAN), a virtual private network (VPN), a virtual private LAN service (VPLS) network, etc. The private network implemented by the example communication network 100 may be used to provide network connectivity between multiple customer networks, such as, for example, the customer networks 110, 112 and 114 of the illustrated example. Although the illustrated example depicts the communication network 100 as implementing a private network, the example methods and apparatus disclosed herein are not limited to application only in private networks. For example, the methods and apparatus disclosed herein may be readily adapted for use in any communication network facilitating communication between network nodes/devices.

Turning to the illustrated example of FIG. 1, the example communication network 100 includes a backbone network 120 to interconnect the example customer networks 110, 112 and 114. The example backbone network 120 may be implemented using any network configured to provide a desired level of connectivity between the customer sites. For example, to provide network layer, also known as layer 3 (L3), connectivity between the example customer networks 110, 112 and 114, the example backbone network 120 may be implemented by, for example, an Internet protocol (IP) based network. In another example, to provide data link layer, also known as layer 2 (L2), connectivity between the example customer networks 110, 112 and 114, the example backbone network 120 may be implemented by, for example, a network implementing multi-protocol label switching (MPLS), a layer 2 tunneling protocol, etc.

To couple the example customer networks 110, 112 and 114 to the example backbone network 120, the example communication network 100 includes respective network nodes 130, 132 and 134. The example network nodes 130, 132 and 134 may be implemented by any type of network nodes, such as, for example, network routers, bridges, etc., as well as any combination thereof. In the illustrated example, the example network node 130 includes a network access point 140 to couple the example customer network 110 to the example backbone network 120. Similarly, the example network node 132 includes a network access point 142 and the example network node 134 includes a network access point 144 to couple, respectively, the example customer networks 112 and 114 to the example backbone network 120. In this way, the network devices included in the example customer networks 110, 112 and 114 are able to communicate with each other at the level of connectivity provided by the example backbone network 120. For example, if the example backbone network 120 provides network layer (L3) connectivity, the network devices included in the example customer networks 110, 112 and 114 may communicate with each other using network layer addresses, such as, for example, IP addresses associated with each of the network devices. In another example, if the example backbone network 120 provides data link layer (L2) connectivity, the network devices included in the example customer networks 110, 112 and 114 may communicate with each other using data link layer addresses, such as, for example, Ethernet addresses associated with each of the network devices.

To perform non-intrusive performance measurements according to the methods and apparatus described herein, the example communication network 100 includes example intelligent network interfaces (INIs) 150, 152 and 154. The example INIs 150, 152 and 154 are self-contained devices configured to couple to existing network nodes in the example communication network 100 to exchange test messages for conducting network performance measurements. For example, the INI 150 of the illustrated example is coupled to an available access port 160 of the example network node 130. Similarly, the example INIs 152 and 154 are coupled, respectively, to available access ports 162 and 164 of the respective example network nodes 132 and 134.

In the illustrated example, some or all of the INIs 150, 152 and 154 exchange measurement test messages over the example backbone network 120 to measure network performance between their respective network nodes 130, 132 and 134. The exchange of measurement test messages and resulting network performance measurements are non-intrusive from the perspective that the test messages are generated and received external to the example customer networks 110, 112, and 114 and, thus, do not interfere with or require modification of these networks. Additionally, the exchange of test messages between the INIs 150, 152 and 154 does not require configuring any of the network nodes 130, 132 and 134 into a resident test mode (which may be substantially incompatible with the resident test mode of another of the network nodes 130, 132 and/or 134), thereby making network performance measurement non-intrusive from the perspective that the normal operation of the network nodes 130, 132 and 134 is not interrupted during the exchange of measurement test messages. For example, test messages may be exchanged between the INIs 150, 152 and/or 154 at substantially the same time other network devices (e.g., user devices) coupled to the network nodes 130, 132 and/or 134 are exchanging network traffic during normal operation. Furthermore, the example INIs 150, 152 and 154 are self-contained and draw power from their respective network access ports 160, 162 and 164, thus are non-intrusive from the perspective of not requiring access to separate power sources in the example communication network 100.

The measurement test messages are exchanged between the example INIs 150, 152 and 154 according to the level of connectivity provided by the example backbone network 120. For example, if the example backbone network 120 provides network layer (L3) connectivity, the INIs 150, 152 and 154 may exchange measurement test messages using network layer addresses, such as, for example, IP addresses associated with each of the INIs. In another example, if the example backbone network 120 provides data link layer (L2) connectivity, the INIs 150, 152 and 154 may exchange measurement test messages using data link layer addresses, such as, for example, Ethernet addresses associated with each of the INIs. Exchanging of test messages between the INIs 150, 152 and 154 in the example communication network 100 is discussed in greater detail below in connection with FIG. 2.

In addition to being configured to exchange measurement test messages, some or all of the example INIs 150, 152 and 154 are configured to send measurement reporting messages to a data collection facility 170 included in the example communication network 100. The data collection facility 170 of the illustrated example is coupled to the example backbone network 120 to receive the measurement reporting messages from the example INIs 150, 152 and/or 154 according to the level of connectivity provided by the example backbone network 120 (e.g., such as via network layer (e.g., IP) addresses in the case of network layer connectivity or via data link layer (e.g., Ethernet) addresses in the case of data link layer connectivity). The data collection facility 170 of the illustrated example processes the received measurement reporting messages to determine and report various network performance measurements. The reception and processing of measurement reporting messages by the example data collection facility 170 in the example communication network 100 is discussed in greater detail below in connection with FIG. 2.

To configure some or all of the example INIs 150, 152 and 154, the example communication network 100 includes a remote INI configuration terminal 180. The example remote INI configuration terminal 180 may be implemented using, for example, any workstation, terminal, computing device, etc. The remote INI configuration terminal 180 of the illustrated example is coupled to the example backbone network 120 to send configuration commands to the example INIs 150, 152 and/or 154 according to the level of connectivity provided by the example backbone network 120 (e.g., such as via network layer (e.g., IP) addresses in the case of network layer connectivity or via data link layer (e.g., Ethernet) addresses in the case of data link layer connectivity).

For example, the remote INI configuration terminal 180 may send configuration commands to some or all of the example INIs 150, 152 and 154 to configure the format and/or criteria for exchanging measurement test messages between the INIs, the criteria for sending measurement reporting messages to the example data collection facility 170, etc. Furthermore, in some example implementations, the example INIs 150, 152 and/or 154 can be configured only through commands received via their respective network access ports 160, 162 and/or 164 (e.g., such as the configuration commands from the example remote INI configuration terminal 180) because, in such implementations, the example INIs 150, 152 and/or 154 have no other mechanism for receiving input information other than via the network access ports 160, 162 and/or 164. The sending of configuration commands by the example remote INI configuration terminal 180 to the example INIs 150, 152 and 154 in the example communication network 100 is discussed in greater detail below in connection with FIG. 2.

Figure 2:
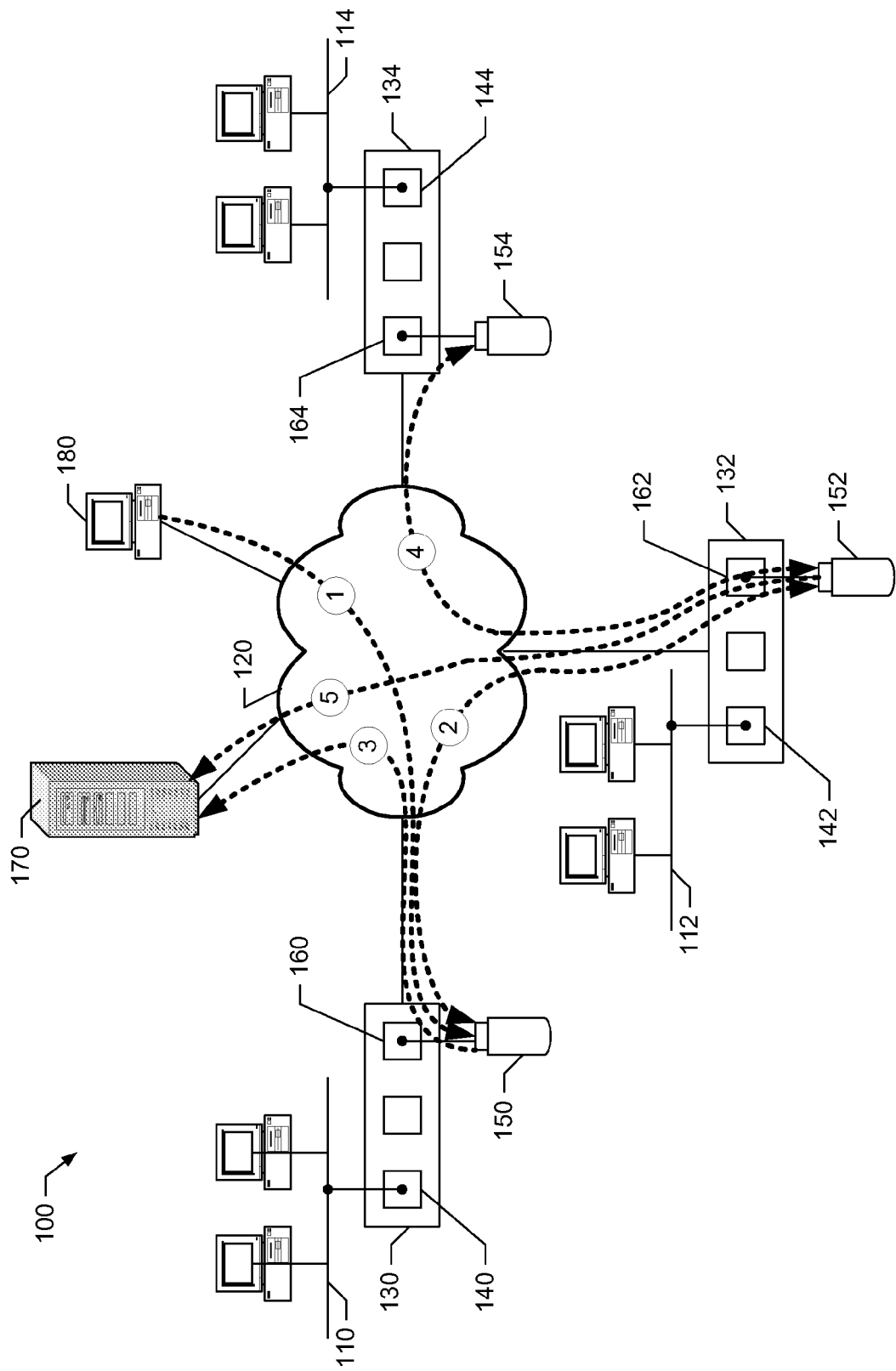
FIG. 2 illustrates an example sequence of operations for performing non-intrusive performance measurements in the example communication network of FIG. 1.

An example sequence of operations for performing non-intrusive performance measurements in the example communication network 100 of FIG. 1 is shown in FIG. 2. The examples of FIGS. 1 and 2 include many elements in common. As such, like elements in FIGS. 1 and 2 are labeled with the same reference numerals. For brevity, the detailed descriptions of these like elements are provided above in connection with the discussion of FIG. 1 and, therefore, are not repeated in the discussion of FIG. 2.

Turning to FIG. 2, the illustrated example operation of the communication network 110 begins with the example remote INI configuration terminal 180 sending one or more configuration commands (indicated by the circle labeled with a number "1" in FIG. 2) to configure the example INI 150 to perform network performance measurements in the example communication network 100. As discussed above, the one or more configuration commands may be sent to the example INI 150 using a network layer (e.g., IP) address and/or a data link layer (e.g., Ethernet) address depending on the level of connectivity provided by the example backbone network 120. In an example implementation, the remote INI configuration terminal 180 sends configuration commands to the example INI 150 to configure some or all of the following parameters: (1) a destination address of a destination INI with which measurement test messages are to be exchanged, (2) transmission criteria for sending the measurement test messages, (3) format parameters for the test messages, (4) format parameters for measurement test message responses, (5) a destination address of a network device to which measurement reporting messages are to be sent, (6) transmission criteria for sending the measurement reporting messages, etc.

For example, depending on the level of connectivity provided by the example backbone network 120, the destination address configured by the example remote INI configuration terminal 180 for exchanging test messages may be a network layer (e.g., IP) address and/or a data link layer (e.g., Ethernet) address associated with a destination INI. Similarly, depending on the level of connectivity provided by the example backbone network 120, the destination address configured by the example remote INI configuration terminal 180 for sending measurement reporting messages may be a network layer (e.g., IP) address and/or a data link layer (e.g., Ethernet) address associated with a data collection facility. The transmission criteria configured by the example remote INI configuration terminal 180 may include, for example, a schedule (e.g., periodic or aperiodic) for sending messages, one or more events (such as a full storage buffer) to trigger the sending of messages, etc. The measurement test message format parameters configured by the example remote INI configuration terminal 180 may include, for example, a message payload size, message payload contents (e.g., such as a time stamp), protocol priority/preference information, etc. The measurement test message response format parameters configured by the example remote INI configuration terminal 180 may include, for example, a response payload size, response payload contents (e.g., such as a time stamp), protocol priority/preference information, etc.

In the illustrated example, the remote INI configuration terminal 180 sends configuration command(s) to the example INI 150 to configure the destination address for exchanged measurement test messages to be an address (e.g., either network layer or data link layer depending on the connectivity provided by the example backbone network 120) of the example INI 152. The remote INI configuration terminal 180 of the illustrated example also sends configuration command(s) to the example INI 150 to configure the destination address for measurement reporting messages to be an address (e.g., either network layer or data link layer depending on the connectivity provided by the example backbone network 120) of the example data collection facility 170.

Next, the example INI 150 exchanges measurement test message(s) (indicated by the circle labeled with a number "2") with the example INI 152 according to the transmission criteria previously configured by the example remote INI configuration terminal 180. For example, the INI 150 generates and sends one or more measurement test messages to the example INI 152 using the destination address (e.g., either network layer or data link layer depending on the connectivity provided by the example backbone network 120) previously configured by the example remote INI configuration terminal 180 (e.g., indicated by the circle labeled with a number "1"). In response, the example INI 152 sends one or more corresponding response messages to the example INI 150 using a response destination address (e.g., either network layer or data link layer depending on the connectivity provided by the example backbone network 120) set to be the origination address included in the measurement test message(s) received from the example INI 150 (indicated by the circle labeled with a number "2").

After exchanging test message(s) with the example INI 152, the example INI 150 prepares and sends one or more measurement reporting messages (indicated by the circle labeled with a number "3") to the example data collection facility 170. For example, the INI 150 generates and sends the one or more measurement test messages to the example data collection facility 170 using the destination address (e.g., either network layer or data link layer depending on the connectivity provided by the example backbone network 120) previously configured by the example remote INI configuration terminal 180 (e.g., indicated by the circle labeled with a number "1"). In the illustrated example, the INI 150 prepares the measurement reporting messages based on the measurement test messages and corresponding responses previously exchanged with the example INI 152 (e.g., indicated by the circle labeled with a number "2"). The example INI 150 then sends the prepared measurement reporting messages(s) to the example data collection facility 170 (indicated by the circle labeled with a number "3") according to the transmission criteria previously configured by the example remote INI configuration terminal 180 (indicated by the circle labeled with a number "1").

In response to receiving the measurement reporting message(s) from the example INI 150, the example data collection facility 170 then processes the received measurement reporting message(s) to determine and report various network performance measurements. For example, in an example implementation in which the example backbone network provides network layer (L3) connectivity, the data collection facility 170 of the illustrated example may determine some or all of the following network performance measurements from the received measurement reporting message(s): (1) network layer packet delay, (2) network layer packet loss, (3) network layer jitter, (4) network layer throughput, etc. In another example implementation in which the example backbone network provides data link layer (L2) connectivity, the data collection facility 170 of the illustrated example may determine some or all of the following network performance measurements from the received measurement reporting message (s): (1) data link layer packet delay, (2) data link layer packet loss, (3) data link layer jitter, (4) data link layer throughput, etc. In either example implementation, the data collection facility 170 of the illustrated example then reports the determined measurements, which may be used, for example, to verify that the example communication network 100 is providing a level of service as guaranteed by a service level agreement (SLA), to debug and/or improve network operation, etc.

In the illustrated example, the example INI 152 is configured to also exchange measurement test message(s) with the example INI 154 (e.g., indicated by the circle labeled with a number "4"), and to send measurement reporting message(s) based on these exchanged test message(s) to the example data collection facility 170 (e.g., indicated by the circle labeled with a number "5"). Then, as for the reporting messages received from the example INI 150, the data collection facility 170 of the illustrated example processes the measurement reporting message(s) received from the example INI 152 to determine and report various network performance measurements. Additionally, the example data collection facility 170 may combine measurement reporting messages received from multiple INIs to determine and report other network performance measurements. For example, the data collection facility 170 of the illustrated example may use the measurement reporting messages received from example INI 150 (e.g., indicated by the circle labeled with a number "3") to determine the network performance between the example network nodes 130 and 132, and the measurement reporting messages received from example INI 152 (e.g., indicated by the circle labeled with a number "5") to determine the network performance between the example network nodes 132 and 134. Additionally, the data collection facility 170 of the illustrated example may combine these measurements to determine the overall network performance for traffic routed between the network nodes 130 and 134 but through the network node 132 (e.g., such as when the network node 132 operates as a intermediate node in a multi-hop network).

Figure 3:
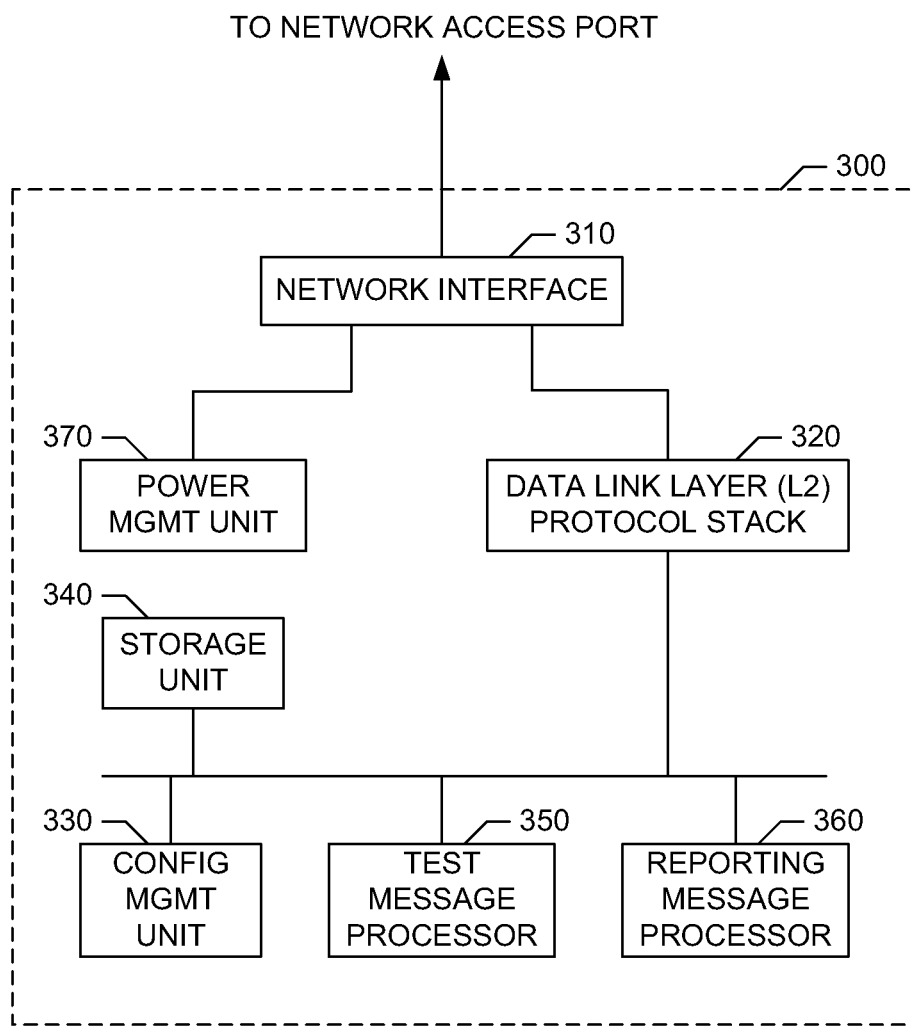
FIG. 3 is a block diagram of an example data link layer INI which may be used to implement the example communication network of FIG. 1.

A block diagram of an example data link layer INI 300 which may be used to implement any or all of the example INIs 150, 152 and/or 154 of the example communication network 100 of FIG. 1 is shown in FIG. 3. The example data link layer INI 300 is configured to be coupled with a network access port (e.g., such as the network access ports 160, 162, 164) of an existing network node (e.g., such as the network nodes 130, 132, 134) to thereby interface with a communication network (e.g., such as the network 100) at a data link layer (L2). As such, the example data link layer INI 300 could be used to implement the example INIs 150, 152 and/or 154 in an example implementation of the communication network 100 in which the example backbone network 120 provides data link layer (L2) connectivity.

The example INI 300 is a self-contained device for performing non-intrusive network performance measurements according to the methods and apparatus described herein. In particular, the example INI 300 is configured to draw power directly from the network access port with which it is coupled and, thus, does not require a separate power source, power adapter, etc. Additionally, the example INI 300 is further configured to generate test messages autonomously without external intervention and to exchange these test messages with other INIs for conducting network performance measurements. Furthermore, the example INI 300 is configured to generate measurement reporting messages autonomously without external intervention and to send these reporting messages to one or more data collection facilities (e.g., such as the data collection facility 170).

Turning to FIG. 3, the example INI 300 includes a network interface 310 configured to physically couple with a network access port (e.g., such as the network access ports 160, 162, 164) of an existing network node (e.g., such as the network nodes 130, 132, 134). As such, the example network interface 310 provides physical layer, also known as layer 1 (L1), connectivity with the existing network node. In an example implementation, the network interface 310 may be implemented by a registered jack 45 (RJ-45) or similar interface to electrically couple the example INI 310 with the network access port of the existing network node. In another example implementation, the network interface 310 may be implemented by a small form-factor pluggable (SFP) or similar transceiver (e.g., such as a 10 gigabit SFP (XFP) transceiver, a transceiver compliant with the XENPACK standard, etc.) to optically couple the example INI 310 with the network access port of the existing network node. In yet another example implementation, the network interface 310 may be implemented by a gigabit interface converter (GBIC) or similar transceiver to optically couple the example INI 310 with the network access port of the existing network node.

To process data sent and received by the example INI 300, the example INI 300 includes a data link layer (L2) protocol stack 320 interfacing with the example network interface 310. The data sent by the example INI 300 using the example data link layer (L2) protocol stack 320 includes data packets carrying the measurement test messages to be exchanged with other INI(s), data packets carrying the measurement reporting messages to be sent to one or more data collection facilities, etc. The example data link layer (L2) protocol stack 320 is configured to packetize these measurement test messages and/or measurement reporting messages, and to append the appropriate destination data link layer (L2) address(es) (e.g., such as an Ethernet address) to the resulting data packets for transmission to the appropriate destination device (e.g., such as another INI or a data collection facility).

The data received by the example INI 300 using the example data link layer (L2) protocol stack 320 includes data packets carrying the measurement test messages received from other INI(s), data packets carrying configuration commands received from one or more remote INI configuration terminals (e.g., such as the remote INI configuration terminal 180), etc. The example data link layer (L2) protocol stack 320 is configured to process the destination data link layer (L2) address(es) (e.g., such as an Ethernet address) included in the received packets carrying such measurement test messages or configuration commands to determine whether the received packets are destined for and should be processed by the example INI 300. Additionally, the example data link layer (L2) protocol stack 320 may process the origination data link layer (L2) address(es) (e.g., such as an Ethernet address) included in the received packets to determine the INI(s) to which corresponding measurement test message response(s) should be sent.

The example INI 300 also includes a configuration management unit 330 to process configuration commands carried by the data packets received and processed by the example data link layer (L2) protocol stack 320. As discussed above, the configuration commands processed by the example configuration management unit 330 may configure any or all of the following parameters: (1) a destination address of a destination INI with which measurement test messages are to be exchanged, (2) transmission criteria for sending the measurement test messages, (3) format parameters for the test messages, (4) format parameters for measurement test message responses, (5) a destination address of a network device to which measurement reporting messages are to be sent, (6) transmission criteria for sending the measurement reporting messages, etc. In the illustrated example, the resulting parameters configured by the configuration management unit 330 are stored in a storage unit 340, which may be implemented by any type of storage element, memory device, etc.

To perform measurement test message processing, the example INI 300 includes a test message processor 350 which interfaces with the example data link layer (L2) protocol stack 320. For example, the test message processor 350 may generate measurement test messages to be exchanged with destination INI(s) using the parameters stored in the example storage unit 340 (e.g., the configured format, destination address, transmission criteria, etc.). Additionally, the example test message processor 350 may receive measurement test messages from other originating INIs, and generate appropriate measurement test message responses using the configured format, etc., parameters stored in the example storage unit 340. Furthermore, the example test message processor 350 may store its generated measurement test messages and corresponding received responses in the example storage unit 340 for use in subsequent measurement reporting.

The example INI 300 also includes a reporting message processor 360 to generate and send measurement reporting messages to be carried by the data packets processed and sent by the example data link layer (L2) protocol stack 320. For example, the reporting message processor 360 may prepare measurement reporting messages to report the contents of the generated measurement test messages and corresponding responses stored in the example storage unit 340. Then, the example reporting message processor 360 may generate measurement reporting messages to be sent to one or more data collection facilities using the configured format, destination address, transmission criteria, etc., parameters stored in the example storage unit 340.

The example INI 300 further includes a power management unit 370 to provide power to the components, devices, circuitry, etc., implementing the example INI 300. For example, the power management unit 370 may provide power to any or all of the example network interface 310, the example data link layer (L2) protocol stack 320, the example configuration management unit 330, the example storage unit 340, the example test message processor 350 and/or the example reporting message processor 360. In the illustrated example, the power management unit 370 interfaces with the example network interface 310 to obtain its source power directly from the network access port with which the example INI 300 is coupled. The example power management unit 370 then regulates, conditions, etc., the source power obtained directly from the network access port to provide the appropriate power signals to the components, devices, circuitry, etc., implementing the example INI 300.

Figure 4:
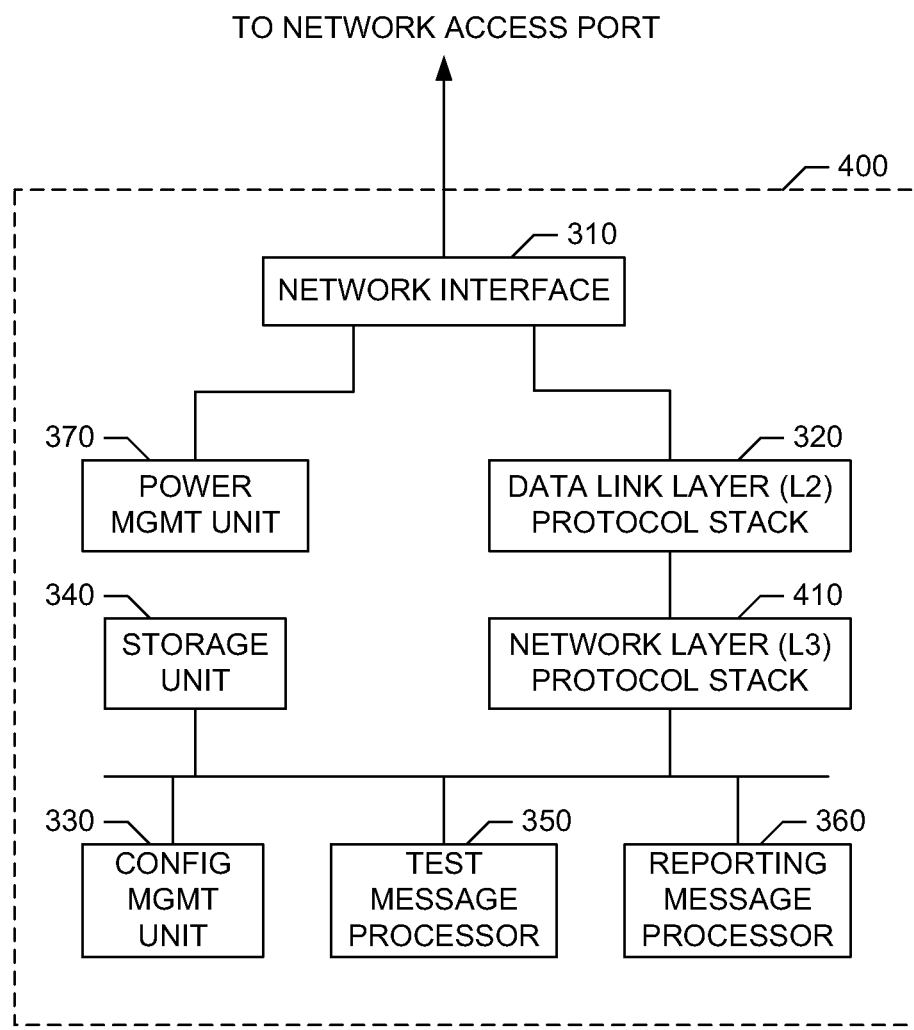
FIG. 4 is a block diagram of an example network layer INI which may be used to implement the example communication network of FIG. 1.

A block diagram of an example network layer INI 400 which may be used to implement any or all of the example INIs 150, 152 and/or 154 of the example communication network 100 of FIG. 1 is shown in FIG. 4. The example network layer INI 400 is configured to be coupled with a network access port (e.g., such as the network access ports 160, 162, 164) of an existing network node (e.g., such as the network nodes 130, 132, 134) to thereby interface with a communication network (e.g., such as the network 100) at a network layer (L3). As such, the example network layer INI 400 could be used to implement the example INIs 150, 152 and/or 154 in an example implementation of the communication network 100 in which the example backbone network 120 provides network layer (L3) connectivity.

The example INI 400, like the example INI 300 of FIG. 3, is a self-contained device for performing non-intrusive network performance measurements according to the methods and apparatus described herein. In particular, the example INI 400 is configured to draw power directly from the network access port with which it is coupled and, thus, does not require a separate power source, power adapter, etc. Additionally, the example INI 400 is further configured to generate test messages autonomously without external intervention and to exchange these test messages with other INIs for conducting network performance measurements. Furthermore, the example INI 400 is configured to generate measurement reporting messages autonomously without external intervention and to send these reporting messages to one or more data collection facilities (e.g., such as the data collection facility 170).

The example INI 400 of FIG. 4 includes many elements in common with the example INI 300 of FIG. 3. As such, like elements in FIGS. 3 and 4 are labeled with the same reference numerals. For brevity, the detailed descriptions of these like elements are provided above in connection with the discussion of FIG. 3 and, therefore, are not repeated in the discussion of FIG. 4.

Turning to FIG. 4, the example INI 400 includes the example network interface 310, the example data link layer (L2) protocol stack 320, the example configuration management unit 330, the example storage unit 340, the example test message processor 350, the example reporting message processor 360 and the example power management unit 370 described in detail above in connection with FIG. 3. Additionally, the example INI 400 includes a network layer (L3) protocol stack 410 interfacing with the example data link layer (L2) protocol stack 320.

In the illustrated example, the network layer (L3) protocol stack 410 processes data to be sent by the example INI 400. The data sent by the example INI 400 carries the measurement test messages to be exchanged with other INI(s), the measurement reporting messages to be sent to one or more data collection facilities, etc., as discussed above. The example network layer (L3) protocol stack 410 is configured to packetize these measurement test messages and/or measurement reporting messages, and to include the appropriate destination network layer (L3) address(es) (e.g., such as an Ethernet address) in the resulting network layer data packets. The example network layer (L3) protocol stack 410 then provides the prepared network layer data packets to the example data link layer (L2) protocol stack 320 for packetizing into corresponding data link layer data packets for transmission to the appropriate destination device (e.g., such as another INI or a data collection facility).

In the illustrated example, the network layer (L3) protocol stack 410 also processes data received by the example INI 400. The data received by the example INI 400 includes data packets carrying the measurement test messages received from other INI(s), the configuration commands received from one or more remote INI configuration terminals (e.g., such as the remote INI configuration terminal 180, etc., as discussed above. The example data network layer (L3) protocol stack 410 is configured to process the destination network layer (L3) address(es) (e.g., such as an IP address) included in the network layer packets output from the example data link layer (L2) protocol stack 320 after it processes the corresponding data link layer packets received via the example network interface 310. The example data network layer (L3) protocol stack 410 uses the processed network layer address(es) to determine whether the received network layer packets carrying the received measurement test messages or configuration commands, etc., are destined for and should be processed by the example INI 400. Additionally, the example network layer (L3) protocol stack 410 may process the origination network layer (L3) address(es) (e.g., such as an IP address) included in the network layer packets output from the example data link layer (L2) protocol stack 320 to determine the INI(s) to which corresponding measurement test message response(s) should be sent.

In some example implementations, the INI 300 of FIG. 3 and/or the INI 400 of FIG. 4 may include an external interface (not shown) to enable local device configuration and/or local reporting of measurement reporting messages. Such an external interface could be implemented by any appropriate interface, such as, for example, a serial port, a universal serial bus (USB), a Bluetooth interface, an infrared (IR) interface, etc.

Figure 5:
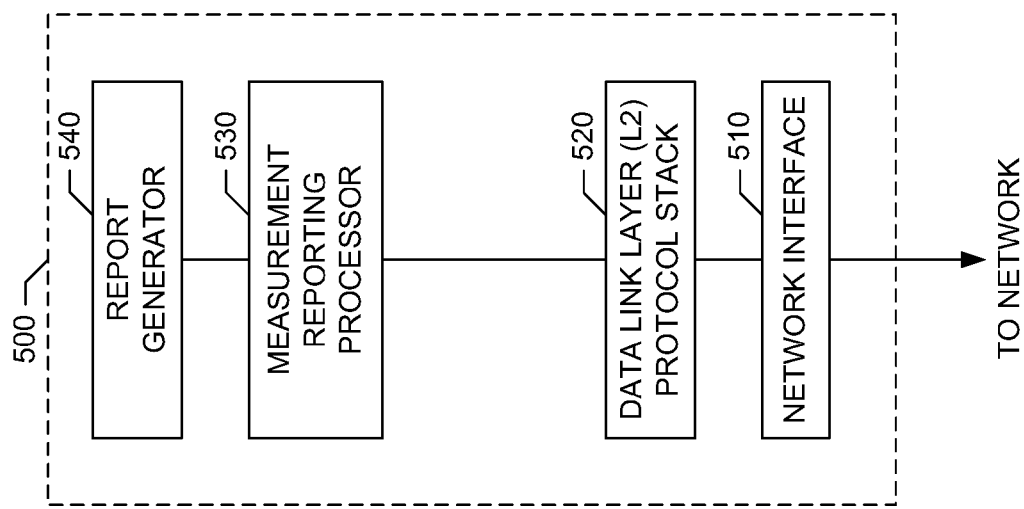
FIG. 5 is a block diagram of an example data collection facility configured to operate on data link layer reporting messages which may be used to implement the example communication network of FIG. 1.

A block diagram of a first example data collection facility 500 which may be used to implement the example data collection facility 170 of the example communication network 100 of FIG. 1 is shown FIG. 5. The first example data collection facility 500 is configured to operate on data link layer reporting messages received via a backbone network (e.g., such as the example backbone network 120) providing data link layer (L2) connectivity. Turning to FIG. 5, the example data collection facility 500 includes a network interface 510 configured to physically couple with a backbone network (e.g., such as the example backbone network 120). As such, the example network interface 510 provides physical layer (L1) connectivity with the backbone network. In an example implementation, the network interface 510 may be implemented by an RJ-45 or similar interface to electrically couple the example data collection facility 500 with the backbone network. In another example implementation, the network interface 510 may be implemented by an SFP or similar transceiver (e.g., such as an XFP transceiver, a transceiver compliant with the XENPACK standard, etc.) to optically couple the example data collection facility 500 with the backbone network. In yet another example implementation, the network interface 510 may be implemented by a GBIC or similar transceiver to optically couple the example data collection facility 500 with the backbone network.

To process data received by the example data collection facility 500, the example data collection facility 500 includes a data link layer (L2) protocol stack 520 interfacing with the example network interface 510. The data received by the example data collection facility 500 using the example data link layer (L2) protocol stack 520 includes, for example, data packets carrying the measurement reporting messages received from one or more INIs implementing non-intrusive network performance monitoring. The example data link layer (L2) protocol stack 520 is configured to process the destination data link layer (L2) address(es) (e.g., such as an Ethernet address) included in the received packets carrying such measurement reporting messages to determine whether the received packets are destined for and should be processed by the example data collection facility 500. Additionally, the example data link layer (L2) protocol stack 520 may process the origination data link layer (L2) address(es) (e.g., such as an Ethernet address) included in the received packets to associate the received measurement reporting message(s) with the appropriate originating INI(s).

The example data collection facility 500 also includes a measurement reporting processor 530 to process the measurement reporting messages received via the example data link layer (L2) protocol stack 520. For example, and as discussed above, because the measurement reporting messages are received via a network providing data link layer (L2) connectivity, the example measurement reporting processor 530 may determine some or all of the following network performance measurements from the received measurement reporting message(s): (1) data link layer packet delay, (2) data link layer packet loss, (3) data link layer jitter, (4) data link layer throughput, etc. Additionally, and as discussed above, the example measurement reporting processor 530 may combine measurement reporting messages received from multiple INIs to determine and report other (e.g., more complex) network performance measurements (e.g., such as data link layer performance measurements associated with multi-hop network topologies).

To report the network performance measurements determined by the example measurement reporting processor 530, the example data collection facility 500 further includes an example report generator 540. In the illustrated example, the report generator 540 is configured to generate one or more reports from the determined network performance measurements which may be used, for example, to verify that the network whose performance is being measured is providing a level of service guaranteed by, for example, a service level agreement (SLA). Additionally or alternatively, the report(s) generated by the example report generator 540 may be used to debug and/or improve network operation, and/or for any other purpose in which having network performance measurements may prove beneficial.

Figure 6:
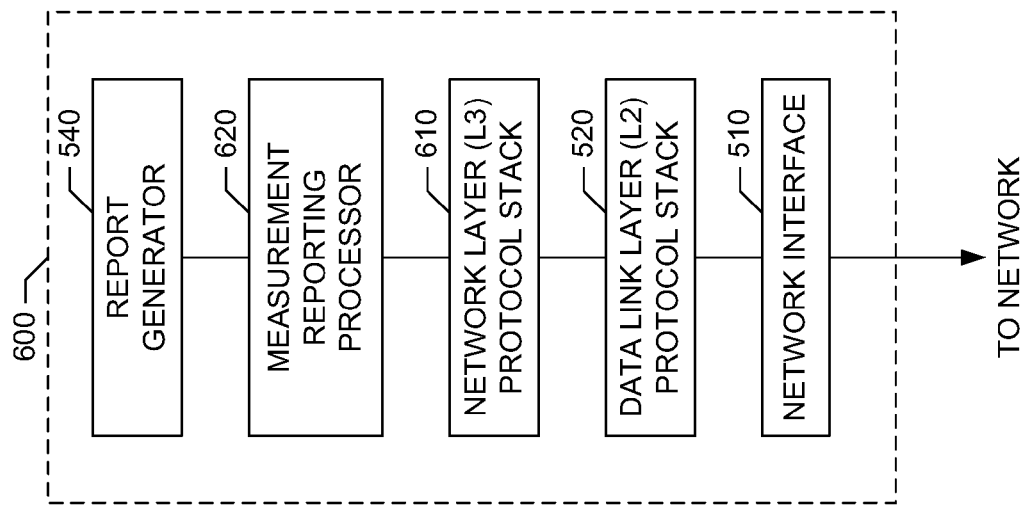
FIG. 6 is a block diagram of an example data collection facility configured to operate on network layer reporting messages which may be used to implement the example communication network of FIG. 1.

A block diagram of a second example data collection facility 600 which may be used to implement the example data collection facility 170 of the example communication network 100 of FIG. 1 is shown FIG. 6. The second example data collection facility 600 is configured to operate on network layer reporting messages received via a backbone network (e.g., such as the example backbone network 120) providing network layer (L3) connectivity. The example data collection facility 600 of FIG. 6 includes many elements in common with the example data collection facility 500 of FIG. 5. As such, like elements in FIGS. 5 and 6 are labeled with the same reference numerals. For brevity, the detailed descriptions of these like elements are provided above in connection with the discussion of FIG. 5 and, therefore, are not repeated in the discussion of FIG. 6.

Turning to FIG. 6, the example data collection facility 600 includes the example network interface 510, the example data link layer (L2) protocol stack 520 and the example report generator 540 described in detail above in connection with FIG. 5. Additionally, the example data collection facility 600 includes a network layer (L3) protocol stack 610 interfacing with the example data link layer (L2) protocol stack 520 to process data received by the example data collection facility 600.

The data received by the example data collection facility 600 using the example network layer (L3) protocol stack 610 includes, for example, data packets carrying the measurement reporting messages received from one or more INIs implementing non-intrusive network performance monitoring. The example network layer (L3) protocol stack 610 is configured to process the destination network layer (L3) address(es) (e.g., such as an IP address) included in the network layer packets output from the example data link layer (L2) protocol stack 520 after it processes the corresponding data link layer packets received via the example network interface 510. The example network layer (L3) protocol stack 610 uses the processed network layer address(es) to determine whether the network layer packets carrying the received measurement reporting messages are destined for and should be processed by the example data collection facility 600. Additionally, the example network layer (L3) protocol stack 610 may process the origination network layer (L3) address(es) (e.g., such as an IP address) included in the received packets to associate the received measurement reporting message(s) with the appropriate originating INI(s).

The example data collection facility 600 also includes a measurement reporting processor 620 to process the measurement reporting messages received via the example network layer (L3) protocol stack 610. For example, and as discussed above, because the measurement reporting messages are received via a network providing network layer (L3) connectivity, the example measurement reporting processor 620 may determine some or all of the following network performance measurements from the received measurement reporting message(s): (1) network layer packet delay, (2) network layer packet loss, (3) network layer jitter, (4) network layer throughput, etc. Additionally, and as discussed above, the example measurement reporting processor 620 may combine measurement reporting messages received from multiple INIs to determine and report other (e.g., more complex) network performance measurements (e.g., such as network layer performance measurements associated with multi-hop network topologies).

Flowcharts representative of example machine readable instructions that may be executed to implement any, all, or portions of the example communication network 100, the example INIs 150, 152, 154, 300 and/or 400, the example data collection facilities 170, 500 and/or 600, the example remote INI configuration terminal 180, the example network interface 310, the example data link layer (L2) protocol stack 320, the example configuration management unit 330, the example test message processor 350, the example reporting message processor 360, the example network layer (L3) protocol stack 410, the example network interface 510, the example data link layer (L2) protocol stack 520, the example measurement reporting processor 530, the example report generator 540, the example network layer (L3) protocol stack 610 and/or the example measurement reporting processor 620 are shown in FIGS. 7, 8A-8B, 9 and 10. In these examples, the machine readable instructions represented by each flowchart may comprise one or more programs for execution by: (a) a processor, such as the processor 1112 shown in the example computer 1100 discussed below in connection with FIG. 11, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1112, but the entire program or programs and/or portions thereof could alternatively be executed by a device other than the processor 1112 and/or embodied in firmware or dedicated hardware (e.g., implemented by an application specific integrated circuit (ASIC), a programmable logic device (PLD), a field programmable logic device (FPLD), discrete logic, etc.). For example, any or all of the example communication network 100, the example INIs 150, 152, 154, 300 and/or 400, the example data collection facilities 170, 500 and/or 600, the example remote INI configuration terminal 180, the example network interface 310, the example data link layer (L2) protocol stack 320, the example configuration management unit 330, the example test message processor 350, the example reporting message processor 360, the example network layer (L3) protocol stack 410, the example network interface 510, the example data link layer (L2) protocol stack 520, the example measurement reporting processor 530, the example report generator 540, the example network layer (L3) protocol stack 610 and/or the example measurement reporting processor 620 could be implemented by any combination of software, hardware, and/or firmware. Also, some or all of the machine readable instructions represented by the flowchart of FIGS. 7, 8A-8B, 9 and 10 may be implemented manually. Further, although the example machine readable instructions are described with reference to the flowcharts illustrated in FIGS. 7, 8A-8B, 9 and 10, many other techniques for implementing the example methods and apparatus described herein may alternatively be used. For example, with reference to the flowcharts illustrated in FIGS. 7, 8A-8B, 9 and 10, the order of execution of the blocks may be changed, and/or some of the blocks described may be changed, eliminated, combined and/or subdivided into multiple blocks.

Figure 7:
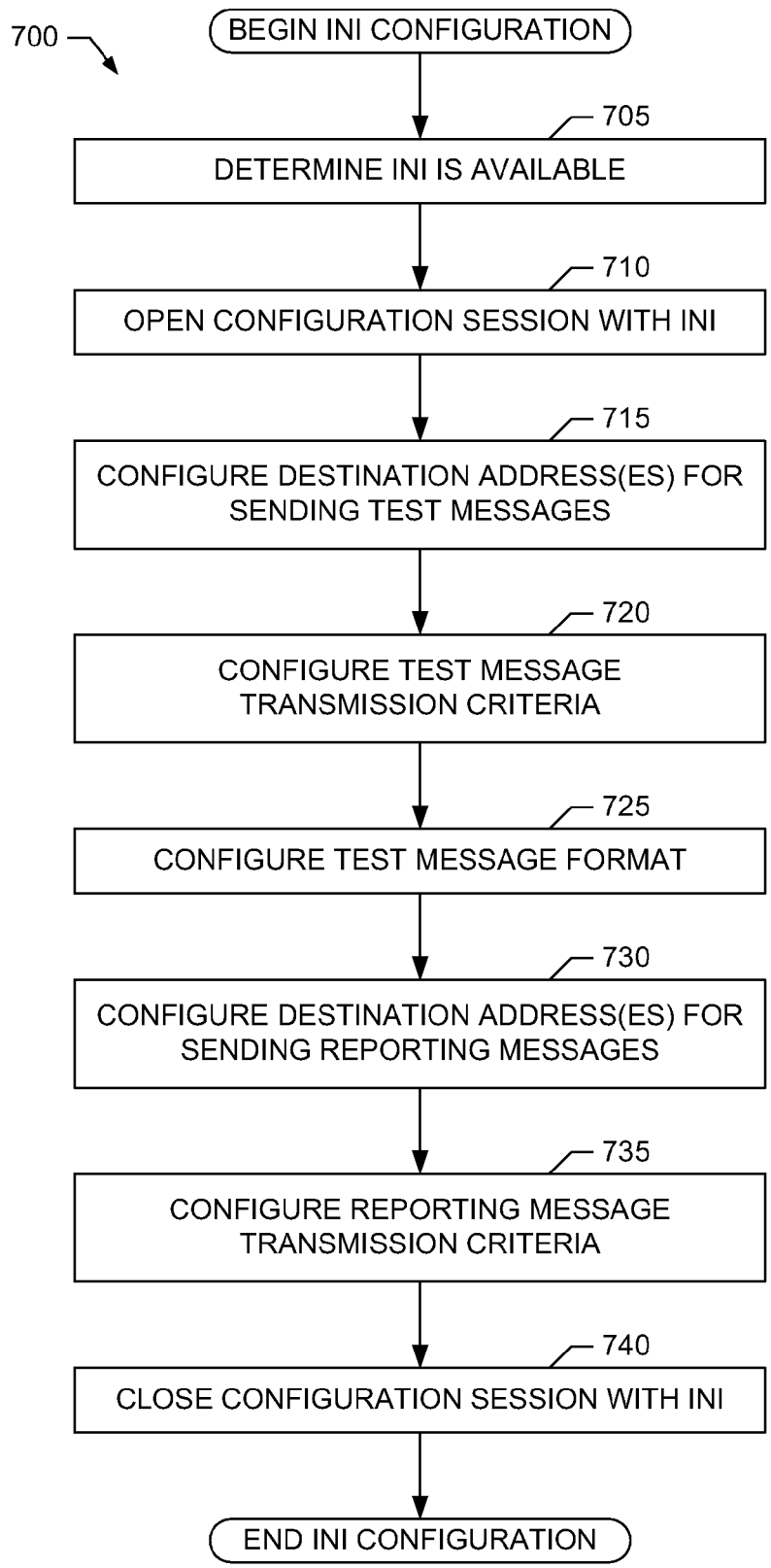
FIG. 7 is a flowchart representative of example machine readable instructions that may be executed to implement remote INI configuration in the example communication network of FIG. 1.

Example machine readable instructions 700 that may be executed to implement remote INI configuration in the example communication network 100 of FIG. 1 are shown in FIG. 7. For example, the machine readable instructions 700 may be executed by the example remote INI configuration terminal 180 to configure any or all of the example INIs 150, 152 and/or 154 in the example communication network 100. Without loss of generality, and for ease of discussion, execution of the example machine readable instructions 700 is described with reference to the configuration of the example INI 150 by the example remote INI configuration terminal 180.

Turning to FIG. 7, the example machine readable instructions 700 begin execution at block 705 at which the example remote INI configuration terminal 180 determines whether the example INI 150 is available for configuration. For example, at block 705 the example remote INI configuration terminal 180 may receive one or more heartbeats or other initialization messages which the example INI 150 is configured to send after being coupled to the network access port 160 of the existing network node 130. Additionally or alternatively, at block 705 an operator of the example remote INI configuration terminal 180 may manually indicate via one or more input commands that the example INI 150 is available for configuration.

After determining that the example INI 150 is available for configuration at block 705, control proceeds to block 710 at which the example remote INI configuration terminal 180 opens a configuration session with the example INI 150. In an example implementation in which the communication network 100 provides data link layer (L2) connectivity, at block 710 the example remote INI configuration terminal 180 may send one or more session initiation commands over the network 100 to the example INI 150 using a data link layer (L2) address (e.g., such as an Ethernet address) associated with the example INI 150. In another example implementation in which the communication network 100 provides network layer (L3) connectivity, at block 710 the example remote INI configuration terminal 180 may send one or more session initiation commands over the network 100 to the example INI 150 using a network layer (L3) address (e.g., such as an IP address) associated with the example INI 150.

After opening the configuration session at block 710, control proceeds to block 715 at which the example remote INI configuration terminal 180 configures one or more destination addresses (e.g., data link layer and/or network layer addresses) associated with one or more destination INIs (e.g., such as the example INIs 152 and/or 154) with which measurement test messages are to be exchanged. In an example implementation in which the communication network 100 provides data link layer (L2) connectivity, at block 715 the example remote INI configuration terminal 180 may send one or more test message destination address configuration commands over the network 100 to the example INI 150 using a data link layer (L2) address (e.g., such as an Ethernet address) associated with the example INI 150. In another example implementation in which the communication network 100 provides network layer (L3) connectivity, at block 715 the example remote INI configuration terminal 180 may send one or more test message destination address configuration commands over the network 100 to the example INI 150 using a network layer (L3) address (e.g., such as an IP address) associated with the example INI 150.

After configuring the one or more destination addresses at block 715, control proceeds to block 720 at which the example remote INI configuration terminal 180 configures the criteria for the example INI 150 to send measurement test messages to the one or more destination INIs. The test message transmission criteria configured at block 720 may include, for example, a transmission schedule, a periodic or aperiodic transmission cycle, a transmission event (e.g., such as a storage full event or other trigger), etc. In an example implementation in which the communication network 100 provides data link layer (L2) connectivity, at block 720 the example remote INI configuration terminal 180 may send one or more test message transmission criteria configuration commands over the network 100 to the example INI 150 using a data link layer (L2) address (e.g., such as an Ethernet address) associated with the example INI 150. In another example implementation in which the communication network 100 provides network layer (L3) connectivity, at block 720 the example remote INI configuration terminal 180 may send one or more test message transmission criteria configuration commands over the network 100 to the example INI 150 using a network layer (L3) address (e.g., such as an IP address) associated with the example INI 150.

After configuring the test message criteria at block 720, control proceeds to block 725 at which the example remote INI configuration terminal 180 configures the format for measurement test message(s) (and possibly responses) to be sent by the example INI 150. The measurement test message format parameters configured at block 725 may include, for example, a message payload size, message payload contents (e.g., such as a time stamp), protocol priority/preference information, etc. In an example implementation in which the communication network 100 provides data link layer (L2) connectivity, at block 725 the example remote INI configuration terminal 180 may send one or more test message format configuration commands over the network 100 to the example INI 150 using a data link layer (L2) address (e.g., such as an Ethernet address) associated with the example INI 150. In another example implementation in which the communication network 100 provides network layer (L3) connectivity, at block 725 the example remote INI configuration terminal 180 may send one or more test message format configuration commands over the network 100 to the example INI 150 using a network layer (L3) address (e.g., such as an IP address) associated with the example INI 150.

After configuring the measurement test message format at block 725, control proceeds to block 730 at which the example remote INI configuration terminal 180 configures one or more destination addresses (e.g., data link layer and/or network layer addresses) associated with one or more data collection facilities (e.g., such as the example data collection facility 170) to which measurement reporting messages are to be sent. In an example implementation in which the communication network 100 provides data link layer (L2) connectivity, at block 730 the example remote INI configuration terminal 180 may send one or more reporting message destination address configuration commands over the network 100 to the example INI 150 using a data link layer (L2) address (e.g., such as an Ethernet address) associated with the example INI 150. In another example implementation in which the communication network 100 provides network layer (L3) connectivity, at block 730 the example remote INI configuration terminal 180 may send one or more reporting message destination address configuration commands over the network 100 to the example INI 150 using a network layer (L3) address (e.g., such as an IP address) associated with the example INI 150.

After configuring the one or more destination addresses at block 730, control proceeds to block 735 at which the example remote INI configuration terminal 180 configures the criteria for the example INI 150 to send measurement reporting messages to the one or more data collection facilities. The reporting message transmission criteria configured at block 720 may include, for example, a transmission schedule, a periodic or aperiodic transmission cycle, a transmission event (e.g., such as a storage full event or other trigger), etc. In an example implementation in which the communication network 100 provides data link layer (L2) connectivity, at block 735 the example remote INI configuration terminal 180 may send one or more reporting message transmission criteria configuration commands over the network 100 to the example INI 150 using a data link layer (L2) address (e.g., such as an Ethernet address) associated with the example INI 150. In another example implementation in which the communication network 100 provides network layer (L3) connectivity, at block 735 the example remote INI configuration terminal 180 may send one or more reporting message transmission criteria configuration commands over the network 100 to the example INI 150 using a network layer (L3) address (e.g., such as an IP address) associated with the example INI 150.

Next, control proceeds to block 740 at which the example remote INI configuration terminal 180 closes the configuration session established with the example INI 150 at block 710. In an example implementation in which the communication network 100 provides data link layer (L2) connectivity, at block 740 the example remote INI configuration terminal 180 may send one or more session termination commands over the network 100 to the example INI 150 using a data link layer (L2) address (e.g., such as an Ethernet address) associated with the example INI 150. In another example implementation in which the communication network 100 provides network layer (L3) connectivity, at block 740 the example remote INI configuration terminal 180 may send one or more session termination commands over the network 100 to the example INI 150 using a network layer (L3) address (e.g., such as an IP address) associated with the example INI 150. Execution of the example machine readable instructions 700 then ends.

Figure 8A:
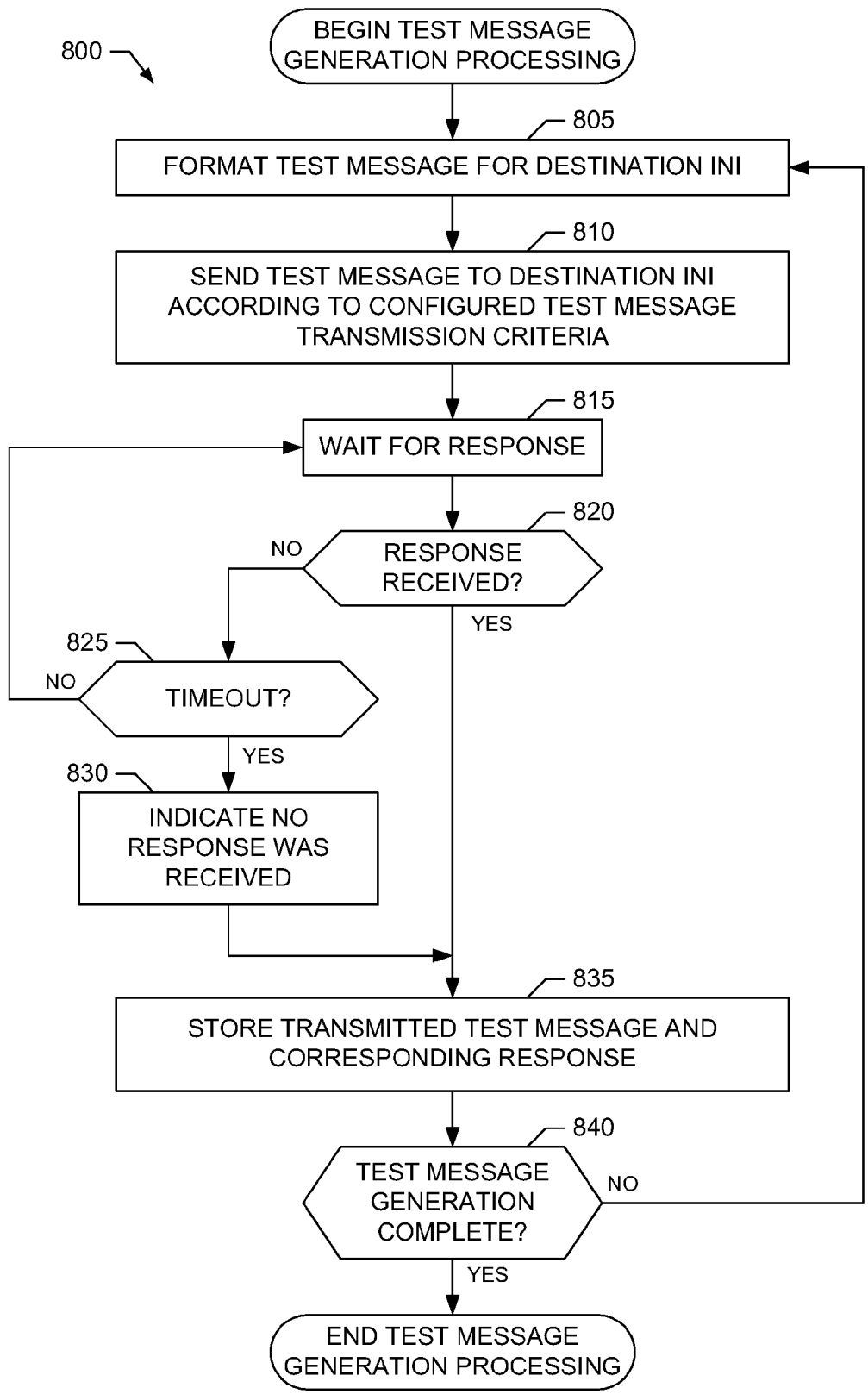
FIG. 8A is a flowchart representative of example machine readable instructions that may be executed to perform measurement test message generation to implement the example data link layer INI of FIG. 3 and/or the example network layer INI of FIG. 4.

Example machine readable instructions 800 that may be executed to implement measurement test message generation processing in one or more of the example INIs 150, 152 and/or 154 of the example communication network 100 of FIG. 1, in the example INI 300 of FIG. 3 and/or the example INI 400 of FIG. 4 are shown in FIG. 8A. The example machine readable instructions 800 may be executed periodically or aperiodically, according to a schedule, upon occurrence of an event, etc. Without loss of generality, and for ease of discussion, execution of the example machine readable instructions 800 is described with reference to the example INI 150 operating in the example communication network 100.

Turning to FIG. 8A, the example machine readable instructions 800 begin execution at block 805 at which the example INI 150 formats a measurement test message to be sent to a destination INI (e.g., such as the example INI 152 or 154). For example, at block 805 the example INI may format the payload size, message payload contents (e.g., such as a time stamp), protocol priority/preference information, etc. of the measurement test message based on parameters configured by the example remote INI configuration terminal 180 and/or via execution of the example machine readable instructions 700 of FIG. 7. Additionally, in an example implementation in which the communication network 100 provides data link layer (L2) connectivity, at block 805 the example INI formats the measurement test message to include a data link layer (L2) address (e.g., such as an Ethernet address) associated with the destination INI. Additionally or alternatively, in an example implementation in which the communication network 100 provides network layer (L3) connectivity, at block 805 the example INI formats the measurement test message to include a network layer (L3) address (e.g., such as an IP address) associated with the destination INI.

After formatting the measurement test message at block 805, control proceeds to block 810 at which the example INI 150 sends the measurement test message to the destination INI according to its configured test message transmission criteria. For example, at block 810 the example INI 150 may send the measurement test message to the destination INI based on one or more of a transmission schedule, a periodic or aperiodic transmission cycle, a transmission event (e.g., such as a storage full event or other trigger), etc., configured by the example remote INI configuration terminal 180 and/or via execution of the example machine readable instructions 700 of FIG. 7. The measurement test message is sent to the destination INI at block 810 using the destination INI's data link layer (L2) and/or network layer (L3) address as appropriate depending on the connectivity provided by the example communication network 100.

After the measurement test message is sent at block 810, control proceeds to block 815 at which the example INI 150 waits for a response from the destination INI. If a response is not received (block 820), control proceeds to block 825 at which the example INI 150 determines whether a timeout period has expired. If the timeout period has not expired (block 825), control returns to block 820 at which the example INI 150 continues to wait for the response from the destination INI. However, if the timeout period has expired (block 825), control proceeds to block 830 at which the example INI 150 determines and indicates that a response to the measurement test message sent at block 810 was not received from the destination INI.

Returning to block 820, if a response was received from the destination INI, or if the example INI 150 indicates that no response was received due to expiration of a timeout period (block 830), control proceeds to block 835. At block 835, the example INI 150 stores the measurement test messages sent at block 810 and the corresponding received response for use in subsequent measurement reporting. The received response stored at block 835 may correspond to the contents of an actual response from the destination INI (e.g., if one is received) or an indication that no response was received (e.g., if the timeout period expired).

Next, control proceeds to block 840 at which the example INI 150 determines whether measurement test message generation is complete. For example, the INI 150 could be configured by the example remote INI configuration terminal 180 to send a finite number (e.g., batch) of measurement test messages to one or more destination INIs. If measurement test message generation is not complete (block 840), control returns to block 805 and blocks subsequent thereto at which the example INI 150 generates the next measurement test message to be sent. If, however, measurement test message generation is complete (block 840), execution of the example machine readable instructions 800 ends. As an alternative to the processing performed at block 840, control could automatically loop back to block 805 to allow test message generation to continue indefinitely, or at least until the example INI 150 is decoupled from the network access port 160 of the existing network node 130.

Figure 8B:
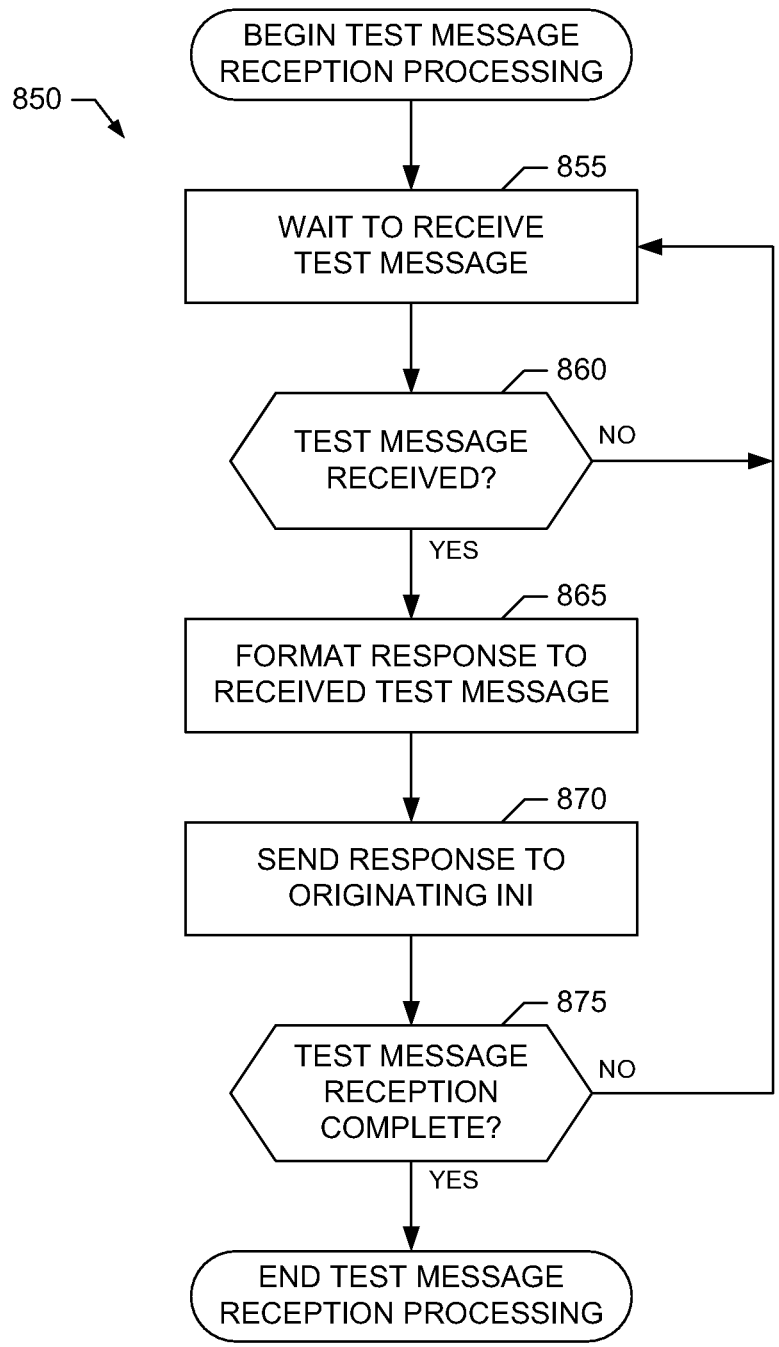
FIG. 8B is a flowchart representative of example machine readable instructions that may be executed to perform measurement test message reception to implement the example data link layer INI of FIG. 3 and/or the example network layer INI of FIG. 4.

Example machine readable instructions 850 that may be executed to implement measurement test message reception processing in one or more of the example INIs 150, 152 and/or 154 of the example communication network 100 of FIG. 1, in the example INI 300 of FIG. 3 and/or the example INI 400 of FIG. 4 are shown in FIG. 8B. The example machine readable instructions 850 may be executed continuously, during a specified (e.g., configured) interval of time, etc. Additionally, in some example implementations the example machine readable instructions 800 and 850 of FIGS. 8A and 8B, respectively, are executed in parallel to allow simultaneous transmission and reception of measurement test messages. Without loss of generality, and for ease of discussion, execution of the example machine readable instructions 850 is described with reference to the example INI 150 operating in the example communication network 100.

Turning to FIG. 8B, the example machine readable instructions 850 begin execution at block 855 at which the example INI 150 waits to receive a measurement test message from an originating INI (e.g., such as the example INI 152 or 154). If a measurement test message is not received (block 860), control returns to block 855 at which the example INI continues to wait to receive a measurement test message. However, if a measurement test message is received (block 860), control proceeds to block 865 at which the example INI 150 formats a response to the received measurement test message. For example, at block 865 the example INI may format the payload size, message payload contents (e.g., such as a time stamp), protocol priority/preference information, etc. of the response based on parameters configured by the example remote INI configuration terminal 180 and/or via execution of the example machine readable instructions 700 of FIG. 7. Additionally, in an example implementation in which the communication network 100 provides data link layer (L2) connectivity, at block 865 the example INI formats the response to include a data link layer (L2) address (e.g., such as an Ethernet address) associated with the originating INI (e.g., and obtained from the received measurement test message). Additionally or alternatively, in an example implementation in which the communication network 100 provides network layer (L3) connectivity, at block 865 the example INI formats the measurement test message to include a network layer (L3) address (e.g., such as an IP address) associated with the originating INI (e.g., and obtained from the received measurement test message).

After formatting the response at block 865, control proceeds to block 870 at which the example INI 150 sends the response to the originating INI corresponding to the received measurement test message. The response is sent to the originating INI at block 870 using the originating INI's data link layer (L2) or network layer (L3) address as appropriate depending on the connectivity provided by the example communication network 100.

Next, control proceeds to block 875 at which the example INI 150 determines whether measurement test message reception is complete. For example, the INI 150 could be configured by the example remote INI configuration terminal 180 to receive a finite number (e.g., batch) of measurement test messages, to perform reception during a finite interval of time, etc. If measurement test message generation is not complete (block 875), control returns to block 855 and blocks subsequent thereto at which the example INI 150 waits to receive the next measurement test message. If, however, measurement test message reception is complete (block 875), execution of the example machine readable instructions 850 ends. As an alternative to the processing performed at block 875, control could automatically loop back to block 855 to allow test message reception to continue indefinitely, or at least until the example INI 150 is decoupled from the network access port 160 of the existing network node 130.

Figure 9:
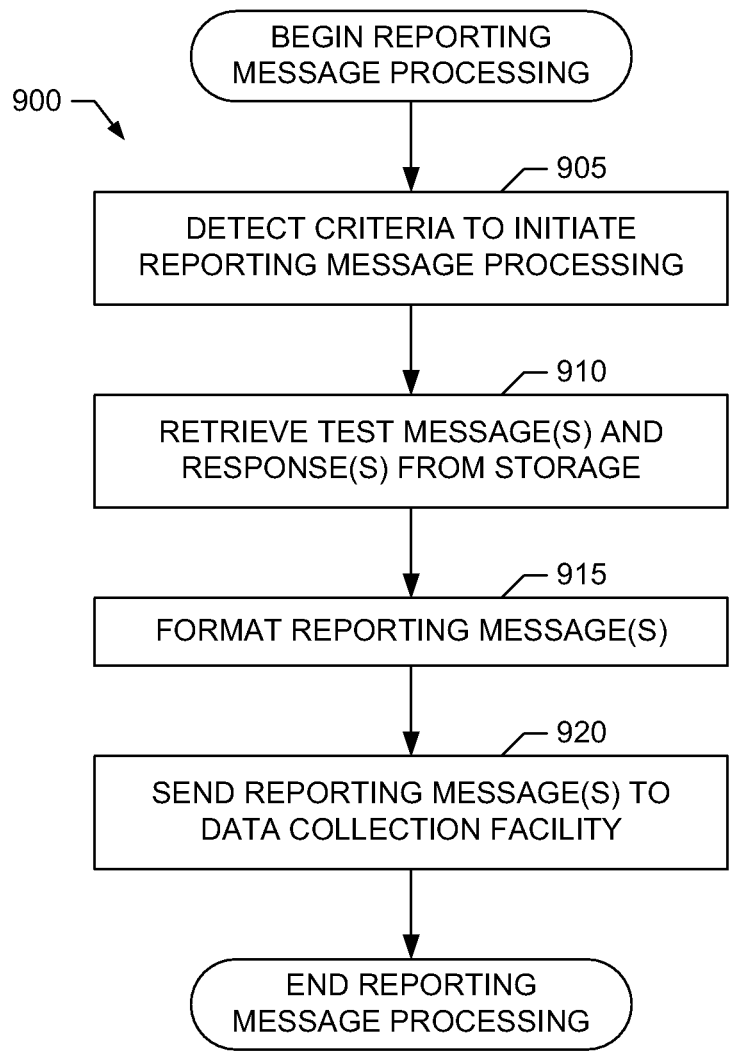
FIG. 9 is a flowchart representative of example machine readable instructions that may be executed to perform reporting message generation to implement the example data link layer INI of FIG. 3 and/or the example network layer INI of FIG. 4.

Example machine readable instructions 900 that may be executed to implement measurement reporting message processing in one or more of the example INIs 150, 152 and/or 154 of the example communication network 100 of FIG. 1, in the example INI 300 of FIG. 3 and/or the example INI 400 of FIG. 4 are shown in FIG. 9. The example machine readable instructions 900 may be executed periodically or aperiodically, according to a schedule, upon occurrence of an event, etc. Without loss of generality, and for ease of discussion, execution of the example machine readable instructions 900 is described with reference to the example INI 150 operating in the example communication network 100.

Turning to FIG. 9, the example machine readable instructions 900 begin execution at block 905 at which the example INI 150 detects one or more criteria causing reporting message processing to be initiated. The criteria detected at block 905 may include, for example, occurrence of a transmission time corresponding to a specified transmission schedule, a periodic or aperiodic transmission cycle, etc., and/or occurrence of a transmission event (e.g., such as storage full event or other trigger). The transmission schedule, the periodic or aperiodic transmission cycle, the transmission event, etc., may be configured by the example remote INI configuration terminal 180 and/or via execution of the example machine readable instructions 700 of FIG. 7.

Next, control proceeds to block 910 at which the example INI 150 retrieves one or more measurement test messages and a corresponding one or more responses from storage (e.g., such as the example storage unit 340 of FIGS. 3 and/or 4). Alternatively, at block 910 the example INI 150 may retrieve the contents (or selected portions thereof) of the one or more measurement test messages and the corresponding one or more responses from storage.

Next, control proceeds to block 915 at which the example INI 150 formats one or more measurement reporting messages to be sent to a data collection facility (e.g., such as the data collection facility 170). For example, at block 915 the example INI may format the contents (or selected portions thereof) of the one or more retrieved measurement test messages and the corresponding one or more retrieved responses into one or more fields of the measurement reporting message(s). Additionally, at block 915 the example INI 150 includes an appropriate address for the destination data collection facility in the example measurement reporting message(s) as configured by the example remote INI configuration terminal 180 and/or via execution of the example machine readable instructions 700 of FIG. 7. For example, in an implementation in which the communication network 100 provides data link layer (L2) connectivity, at block 915 the example INI formats the measurement reporting message(s) to include a data link layer (L2) address (e.g., such as an Ethernet address) associated with the destination data collection facility. Additionally or alternatively, in an example implementation in which the communication network 100 provides network layer (L3) connectivity, at block 915 the example INI formats the measurement reporting message(s) to include a network layer (L3) address (e.g., such as an IP address) associated with the destination data collection facility.

After formatting the measurement reporting message(s) at block 915, control proceeds to block 920 at which the example INI 150 sends the measurement reporting message(s) to the destination data collection facility. The measurement reporting message(s) sent to the destination data collection facility at block 920 uses/(use) the destination data collection facility's data link layer (L2) and/or network layer (L3) address as appropriate depending on the connectivity provided by the example communication network 100. After sending the measurement reporting message(s) at block 920, execution of the example machine readable instructions 900 ends.

Figure 10:
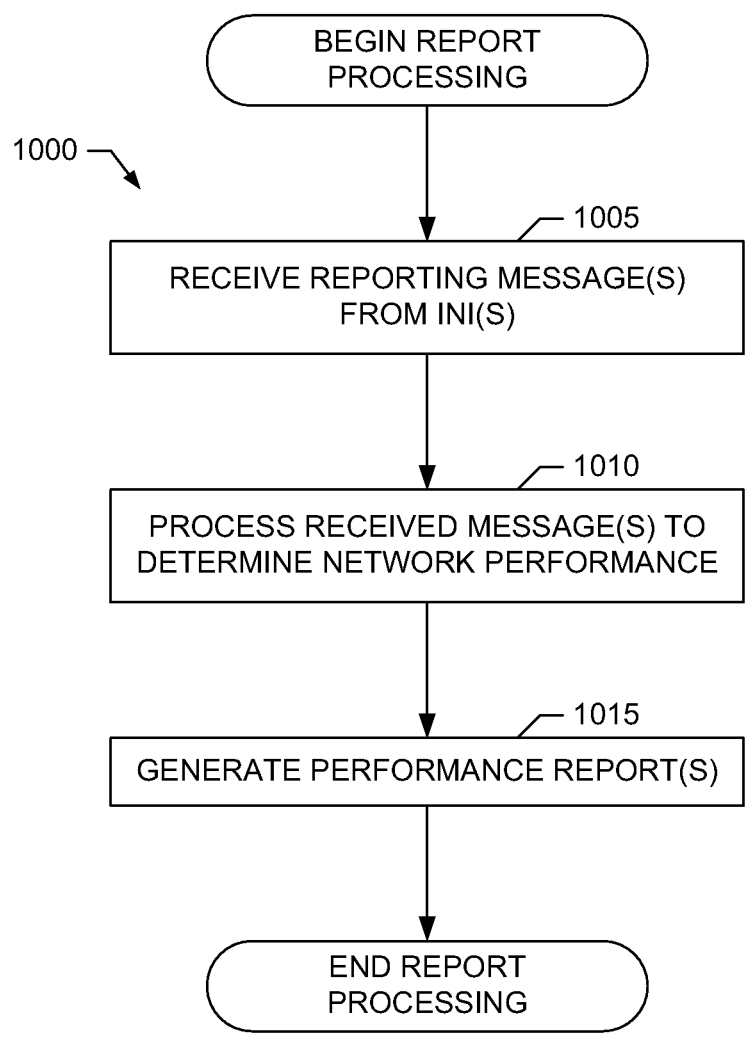
FIG. 10 is a flowchart representative of example machine readable instructions that may be executed to perform report processing to implement the example data collection facilities of FIGS. 5 and/or 6.

Example machine readable instructions 1000 that may be executed to implement measurement report processing in the example data collection facility 170 of FIG. 1, the example data collection facility 500 of FIG. 5 and/or the example data collection facility 600 of FIG. 6 are shown in FIG. 10. The example machine readable instructions 1000 may be executed continuously, during a specified (configured) interval of time, etc. Without loss of generality, and for ease of discussion, execution of the example machine readable instructions 1000 is described with reference to the example data collection facility 170 operating in the example communication network 100.

Turning to FIG. 10, the example machine readable instructions 1000 begin execution at block 1005 at which the example data collection facility 170 receives one or more reporting messages from one or more INIs (e.g., such as the INIs 150, 152 and/or 154) operating in the example communication network 100. Additionally, at block 1005 the example data collection facility 170 may process the origination address(es) (e.g., data link layer (L2) and/or network layer (L3) address(es)) included in the received message(s) to associate the received measurement reporting message(s) with the appropriate originating INI(s). Next, control proceeds to block 1010 at which the example data collection facility 170 processes the measurement reporting message(s) received at block 1005 to determine network performance in the form of one or more determined network performance measurements.

In an example implementation in which the received measurement reporting messages correspond to a network (e.g., the communication network 100) providing data link layer (L2) connectivity, at block 1010 the example data collection facility 170 may determine some or all of the following network performance measurements from the received measurement reporting message(s): (1) data link layer packet delay, (2) data link layer packet loss, (3) data link layer jitter, (4) data link layer throughput, etc. Additionally, and as discussed above, at block 1010 the example data collection facility 170 may combine measurement reporting messages received from multiple INIs to determine and report other (e.g., more complex) network performance measurements (e.g., such as data link layer performance measurements associated with multi-hop network topologies).

In another example implementation in which the received measurement reporting messages correspond to a network (e.g., the communication network 100) providing network layer (L3) connectivity, at block 1010 the example data collection facility 170 may determine some or all of the following network performance measurements from the received measurement reporting message(s): (1) network layer packet delay, (2) network layer packet loss, (3) network layer jitter, (4) network layer throughput, etc. Additionally, and as discussed above, the example data collection facility 170 may combine measurement reporting messages received from multiple INIs to determine and report other (e.g., more complex) network performance measurements (e.g., such as network layer performance measurements associated with multi-hop network topologies).

After processing the received measurement reporting message(s) at block 1010, control proceeds to block 1015 at which the example data collection facility 170 generates one or more performance report(s) based on the determined network performance measurements. The report(s) generated at block 1015 may be used, for example, to verify that the network whose performance is being measured is providing a level of service guaranteed by, for example, a service level agreement (SLA). Additionally or alternatively, the report(s) generated at block 1015 may be used to debug and/or improve network operation, and/or for any other purpose in which having network performance measurements may prove beneficial. After report generation at block 1015 completes, execution of the example machine readable instructions 1000 ends.

Figure 11:
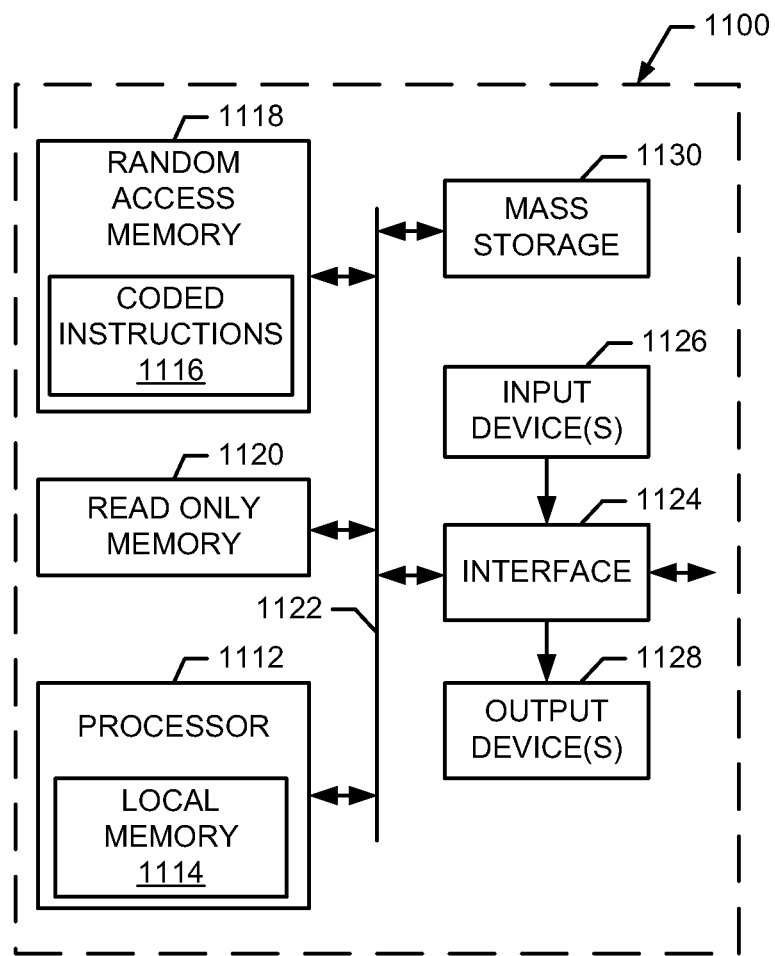
FIG. 11 is a block diagram of an example computer that may execute the example machine readable instructions of FIGS. 7, 8A-8B, 9 and/or 10 to implement the example communication network of FIG. 1.

FIG. 11 is a block diagram of an example computer system 1100 capable of implementing the apparatus and methods disclosed herein. The computer 1100 can be, for example, a server, a personal computer, a personal digital assistant (PDA), an Internet appliance, a DVD player, a CD player, a digital video recorder, a personal video recorder, a set top box, or any other type of computing device.

The system 1100 of the instant example includes a processor 1112 such as a general purpose programmable processor. The processor 1112 includes a local memory 1114, and executes coded instructions 1116 present in the local memory 1114 and/or in another memory device. The processor 1112 may execute, among other things, the machine readable instructions represented in FIGS. 7, 8A-8B, 9 and/or 10. The processor 1112 may be any type of processing unit, such as one or more microprocessors from the Intel® Centrin® family of microprocessors, the Intel® Pentium® family of microprocessors, the Intel® Itanium® family of microprocessors, and/or the Intel XScale® family of processors. Of course, other processors from other families are also appropriate.

The processor 1112 is in communication with a main memory including a volatile memory 1118 and a non-volatile memory 1120 via a bus 1122. The volatile memory 1118 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1120 may be implemented by flash memory and/or any other desired type of memory device. Access to the main memory 1118, 1120 is typically controlled by a memory controller (not shown).

The system 1100 also includes an interface circuit 1124. The interface circuit 1124 may be implemented by any type of interface standard, such as an Ethernet interface, a universal serial bus (USB), and/or a third generation input/output (3GIO) interface.

One or more input devices 1126 are connected to the interface circuit 1124. The input device(s) 1126 permit a user to enter data and commands into the processor 1112. The input device(s) can be implemented by, for example, a keyboard, a mouse, a touchscreen, a track-pad, a trackball, an isopoint and/or a voice recognition system.

One or more output devices 1128 are also connected to the interface circuit 1124. The output devices 1128 can be implemented, for example, by display devices (e.g., a liquid crystal display, a cathode ray tube display (CRT)), by a printer and/or by speakers. The interface circuit 1124, thus, typically includes a graphics driver card.

The interface circuit 1124 also includes a communication device such as a modem or network interface card to facilitate exchange of data with external computers via a network (e.g., an Ethernet connection, a digital subscriber line (DSL), a telephone line, coaxial cable, a cellular telephone system, etc.). For example, the interface circuit 1124 may implement the example network interface 510 of FIGS. 5 and/or 6.

The system 1100 also includes one or more mass storage devices 1130 for storing software and data. Examples of such mass storage devices 1130 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to measure network layer performance between network nodes, the method comprising:
communicatively coupling a first intelligent network interface to a first access port of a first network node that provides access to a network;
subsequent to the coupling, receiving via the network, at the first intelligent network interface, a destination address for a second intelligent network interface to which test messages for measuring network layer performance are to be sent, the destination address for the second intelligent network interface being included in a remote configuration command received in response to the first intelligent network interface initiating sending of multiple heartbeat signals after being communicatively coupled to the first access port; and
transmitting, while a device communicatively coupled to a second access port of the first network node is able to exchange network traffic with the network through the second access port, the test messages from the first intelligent network interface to the destination address for the second intelligent network interface using network layer addressing to route the test messages through the first access port, the first network node and a second network node to which the second intelligent network interface is communicatively coupled.

2. The method as defined in claim 1 wherein communicatively coupling the first intelligent network interface to the first access port of the first network node comprises connecting the first intelligent network interface to an interface of the first network node, the interface comprising at least one of a small form-factor pluggable transceiver, a ten gigabit small form-factor pluggable transceiver, a transceiver compliant with the XENPACK standard or a gigabit interface converter.

3. The method as defined in claim 1 wherein communicatively coupling the first intelligent network interface to the first access port of the first network node comprises connecting the first intelligent network interface to an interface of the first network node, the interface comprising a registered jack 45 interface.

4. The method as defined in claim 1 further comprising sending reporting messages from the first intelligent network interface to a data collection facility communicatively coupled to the network, the reporting messages originating in the first intelligent network interface and being based on the test messages, and the reporting messages enabling determination of at least one of network layer packet delay, network layer packet loss, network layer jitter or network layer throughput between the first and second network nodes.

5. The method as defined in claim 4 further comprising receiving a configuration command via the network at the first intelligent network interface to configure at least one of a reporting message transmission criterion or a destination address for the reporting messages.

6. The method as defined in claim 4 wherein the reporting messages include information characterizing network layer performance between the first and second network nodes.

7. The method as defined in claim 1 wherein the destination address comprises a network layer address associated with the second intelligent network interface.

8. The method as defined in claim 1 wherein transmitting the test messages from the first intelligent network interface to the destination address of the second intelligent network interface comprises:
originating a first test message in the first intelligent network interface; and
transmitting the first test message to the destination address of the second intelligent network interface; and the method further comprises:
receiving a second test message from the second intelligent network interface in response to the second intelligent network interface receiving the first test message.

9. The method as defined in claim 1 wherein the first network node implements a first resident test mode to measure network layer performance and the second network node implements a second resident test mode to measure network layer performance, the first and second resident test modes are incompatible, and the test messages are exchanged between the first intelligent network interface and the second intelligent network interface to measure network layer performance without invoking the incompatible first and second resident test modes of the respective first and second network nodes.

10. The method as defined in claim 1 wherein the network layer addressing comprises Internet protocol addressing.

11. A tangible machine readable memory having machine readable instructions stored thereon which, when executed, cause a processor implementing a first intelligent network interface to perform operations comprising:
processing a remote configuration message to obtain a destination address included in the remote configuration message, the destination address associated with a second intelligent network interface to which test messages for measuring network layer performance are to be sent, the remote configuration message being received in response to the processor initiating sending of multiple heartbeat signals after the intelligent network interface is communicatively coupled to a first access port of a first network node;
sending, while a device communicatively coupled to a second access port of the first network node is able to exchange network traffic other than test traffic with a network through the second access port, a first test message to the destination address associated with the second intelligent network interface; and
receiving a response to the first test message from the second intelligent network interface, the first test message originating in the first intelligent network interface and being routed, using network layer addressing, through the first network node and a second network node to which the second intelligent network interface is communicatively coupled.

12. The tangible machine readable memory as defined in claim 11 wherein the the reporting message originating in the first intelligent network interface and being based on the first test message, and the reporting message enabling determination of at least one of network layer packet delay, network layer packet loss, network layer jitter or network layer throughput between the first and second network nodes.

13. The tangible machine readable memory as defined in claim 12 wherein the operations further comprise configuring at least one of a reporting message transmission criterion or a destination address for the reporting message in response to a configuration command received over the network.

14. The tangible machine readable memory as defined in claim 12 wherein the reporting message includes information characterizing network layer performance between the first and second network nodes.

15. The tangible machine readable memory as defined in claim 11 wherein the network layer addressing comprises Internet protocol addressing.

16. An intelligent network interface apparatus to measure network layer performance between network nodes of a network, the apparatus comprising:
- a processor to execute the instructions to perform operations comprising:
  - initiating sending of multiple heartbeat signals in response to the apparatus being communicatively coupled to an access port of a network node that is to provide access to the network; and
  - processing a remote configuration command to obtain a network layer destination address included in the remote configuration command, the network layer address associated with a destination intelligent network interface to which test messages for measuring network layer performance are to be send the remote configuration command being received in response to the sending of the multiple heartbeat signals; and
  - generating a test message to send to the destination intelligent network interface, the test message processor to use the network layer destination address associated with the destination intelligent network interface to send the test message to the destination intelligent network interface.

17. The intelligent network interface apparatus as defined in claim 16 wherein the intelligent network interface apparatus is to obtain power and input information only from the access port after being coupled to the access port.

18. The intelligent network interface apparatus as defined in claim 16 wherein the network layer destination address is a first network layer address, and the remote configuration command is addressed to the intelligent network interface apparatus using a second network layer address associated with the apparatus.

19. The intelligent network interface apparatus as defined in claim 16 wherein the intelligent network interface apparatus is a self-contained device provided solely for network layer performance measurement.

20. The intelligent network interface apparatus as defined in claim 16 wherein the operations fluffier comprise preparing, based on the test message, a reporting message to send to a data collection facility to determine at least one of network layer packet delay, network layer packet loss, network layer jitter or network layer throughput in the network.

21. The intelligent network interface apparatus as defined in claim 20 wherein the network node is a first network node, and the reporting message includes information characterizing network layer performance between the first network node and a second network node to which the destination intelligent network interface is communicatively coupled.

22. The intelligent network interface apparatus as defined in claim 16 wherein the operations further comprise storing at least one of the test message or a response to the test message.

23. The intelligent network interface apparatus as defined in claim 16 wherein the network layer address comprises an Internet protocol address.

24. The intelligent network interface apparatus as defined in claim 16 wherein the access port of the network node is a first access port, and the network node is to exchange network traffic between a user device and the network through a second access port of the network node at substantially a same time the intelligent network interface apparatus sends the test message to the destination intelligent network interface.

25. The intelligent network interface apparatus as defined in claim 16 wherein the network node has a resident test mode to measure network layer performance, and the test message is sent to the destination intelligent network interface to measure network layer performance without invoking the resident test mode of the network node.

\* \* \* \* \*